United States Patent [19]

Amedei et al.

[11] Patent Number: 5,020,419
[45] Date of Patent: Jun. 4, 1991

[54] THREE POSITION FLUID-CONTROLLED ACTUATOR

[75] Inventors: Giuseppe Amedei, Modena; Angelo Rondelli, Cento, both of Italy

[73] Assignee: Fiatgeotech - Tecnologie Per La Terra S.p.A., Modena, Italy

[21] Appl. No.: 359,374

[22] Filed: May 31, 1989

[30] Foreign Application Priority Data

May 31, 1988 [IT]  Italy ............................. 67500 A/88

[51] Int. Cl.$^5$ ............................................. F01B 7/20
[52] U.S. Cl. .................................... 92/52; 92/117 A; 192/85 C; 192/86
[58] Field of Search ............ 91/51, 462, 464, 465; 92/117 R, 169.1, 52, 117 A, 69 R; 192/85 C, 86

[56] References Cited

U.S. PATENT DOCUMENTS

| | | | |
|---|---|---|---|
| 2,806,449 | 9/1957 | Simmons | 92/52 |
| 3,875,849 | 4/1975 | Patel | 91/374 X |
| 3,945,265 | 3/1976 | Bell et al. | 74/335 |
| 4,002,105 | 1/1977 | Bell et al. | 92/65 X |
| 4,593,606 | 6/1986 | Klatt et al. | 92/52 |
| 4,716,815 | 1/1988 | Stewart | 91/464 |
| 4,773,300 | 9/1988 | Klatt et al. | 92/52 |

FOREIGN PATENT DOCUMENTS 2351814  4/1975  Fed. Rep. of Germany ... 92/117 A

*Primary Examiner*—John T. Kwon
*Assistant Examiner*—John Ryznic
*Attorney, Agent, or Firm*—Kane, Dalsimer, Sullivan, Kurucz, Levy, Eisele and Richard

[57] ABSTRACT

A three-position hydraulic actuator comprising an outer body defining a cylindrical inner cavity; a dual-rod piston sliding inside the cavity; a pair of stop rings mounted in respective central annular seats in the lateral wall of the cavity and on the piston; and a pair of bushes sliding in sealed manner between the piston and the lateral wall of the cavity and located on axially opposite sides in relation to the stop rings.

9 Claims, 2 Drawing Sheets

THREE POSITION FLUID-CONTROLLED ACTUATOR

BACKGROUND OF THE INVENTION

The present invention relates to a fluid-controlled actuator, particularly for controlling a clutch on a mechanical assembly, e.g. the transmission, reduction gear, or reversing gear of a vehicle or machine in general.

Mechanical assembly clutches are frequently operated using three-position fluid-controlled (hydraulic or pneumatic) actuators.

Known actuators of the aforementioned type comprise two pistons sliding in sealed manner inside a cylinder in which they define substantially three isolated chambers. One of the pistons usually presents an active rod secured to the mechanical member being controlled, whereas the outer is designed to slide inside the cylinder, and to cooperate with the first substantially for the purpose of adjusting its limit stop position. The aforementioned three positions are therefore achieved by supplying said chambers either selectively or in conjunction with one another.

Known actuators of the aforementioned type present numerous drawbacks. Firstly, they are fairly complex and expensive to produce, by virtue of featuring two pistons, and due to the mechanical machining required for the pistons and cylinder. Secondly, they require the use of relatively complex fluidic components. And thirdly, due to lack of a precise relationship between the position of the controlled member and that of the two pistons on the actuator, any means for detecting the position of the controlled member are activatable solely by the member itself or the "active" rod integral with the same, whereas, for certain applications said means may be preferably activated by the other rod for reasons of size and assembly.

SUMMARY OF THE INVENTION

The aim of the present invention is to provide a fluid-controlled actuator designed to overcome the drawbacks typically associated with known actuators of the afore-mentioned type.

With this aim in view, according to the present invention, there is provided a three-position fluid-controlled actuator comprising an outer body defining a cylindrical cavity; a piston sliding inside said cavity and having at least one rod projecting from said outer body and secured to clutch means for a mechanical assembly; control means for controlling said piston via a fluid, and connected to two openings formed on said outer body close to opposite ends of said cavity; and auxiliary means sliding inside said cavity and designed to establish an intermediate piston stop position; characterised by the fact that said auxiliary means comprise at least a bush coaxial with said piston and sliding in sealed manner between said piston and the lateral wall of said cavity; first axial locating means between said bush and a center portion of said cavity; and second axial locating means between said bush and a center portion of said piston.

BRIEF DESCRIPTION OF THE DRAWINGS

A preferred non-limiting embodiment of the invention will be described by way of example with reference to the accompanying drawings, in which.

DETAILED DESCRIPTION OF THE INVENTION

Figure 1:
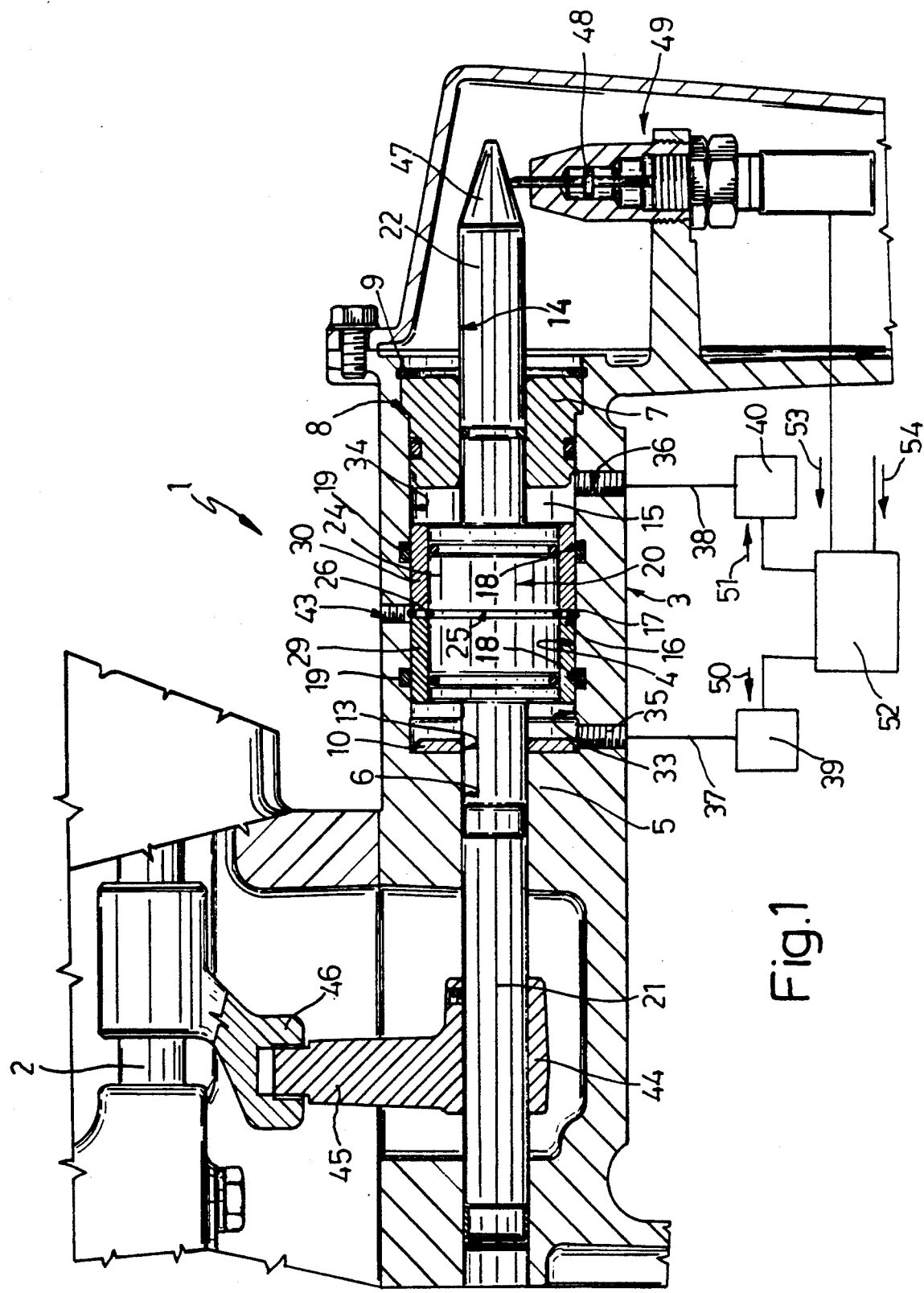
FIG. 1 shows a longitudinal section of a hydraulic actuator in accordance with the teachings of the present invention, and applied to a clutch of a vehicle transmission.

Number 1 in FIG. 1 indicates a hydraulic actuator for controlling the control rod 2 of a clutch on a vehicle gear transmission (not shown).

Actuator 1 comprises a conveniently cast outer body 3 inside which is formed a cylindrical cavity 4. Said cavity 4 is defined axially by an end wall 5 of outer body 3 having a through hole 6 coaxial with cavity 4, and by a cap 7 locked axially against a shoulder 8 of cavity 4 by means of a retaining ring 9. Inside cavity 4, wall 5 is fitted with a substantially round plate 10. Said plate 10 and cap 7 present respective centre through holes 13, 14 coaxial with and equal in diameter to hole 6 in wall 5.

The inner lateral wall 15 of cavity 4 presents a central annular seat 16 partially housing a steel toroidal ring 17; and a further two annular seats 18 housing respective sealing rings 19 and respectively located midway between seat 16 and plate 10, and seat 16 and cap 7.

Cavity 4 houses a sliding piston 20 smaller in diameter than cavity 4 and fitted at each end with two coaxial rods 21, 22 sliding in sealed manner inside holes 6 13 in wall 5 and plate 10 respectively, and hole 14 in cap 7.

Lateral wall 24 of piston 20 presents a central annular seat 25 partially housing a steel toroidal ring 26; and a pair of lateral annular seats 27 housing respective sealing rings 28. Between inner wall 15 of cavity 4 and outer wall 24 of piston 20, there are mounted two hollow cylindrical sliding bushes 29, 30 respectively located on the plate 10 and cap 7 side in relation to toroidal rings 17 and 26. Said bushes 29, 30 present substantially the same axial length as the portions of piston 20 extending between central seat 25 and a respective front face of piston 20, and present an outer surface cooperating in sealed manner with rings 19, and an inner surface cooperating in sealed manner with rings 28.

Cavity 4 thus houses two isolated chambers 33, 34 extending respectively between plate 10, piston 20 and bush 29, and between cap 7, piston 20 and bush 30. Said chambers 33, 34 communicate via respective radial holes 35, 36 and respective ducts 37, 38 with respective known solenoid valves 39, 40 (shown schematically in FIG. 1) connected to hydraulic supply means (not shown). Cavity 4 also communicates externally via a center radial hole 43 enabling air intake (or exhaust) into (from) the portion of cavity 4 extending between bushes 29, 30.

Rod 21 of piston 20 is fitted with a coupling 44 having a tab 45 designed to cooperate with a fork 46 integral with clutch control rod 2. Rod 22 terminates in a conical portion 47 designed to cooperate with the moving element 48 of a known potentiometer type position sensor 49. Solenoid valves 39, 40 are controlled by output signals 50, 51 generated by an electronic control system 52 as a function of an input signal 53 from sensor 49 or one or more signals 54 produced by any known type of manually or automatically operated control means (not shown).

Actuator 1 operates as follows.

Figure 2:
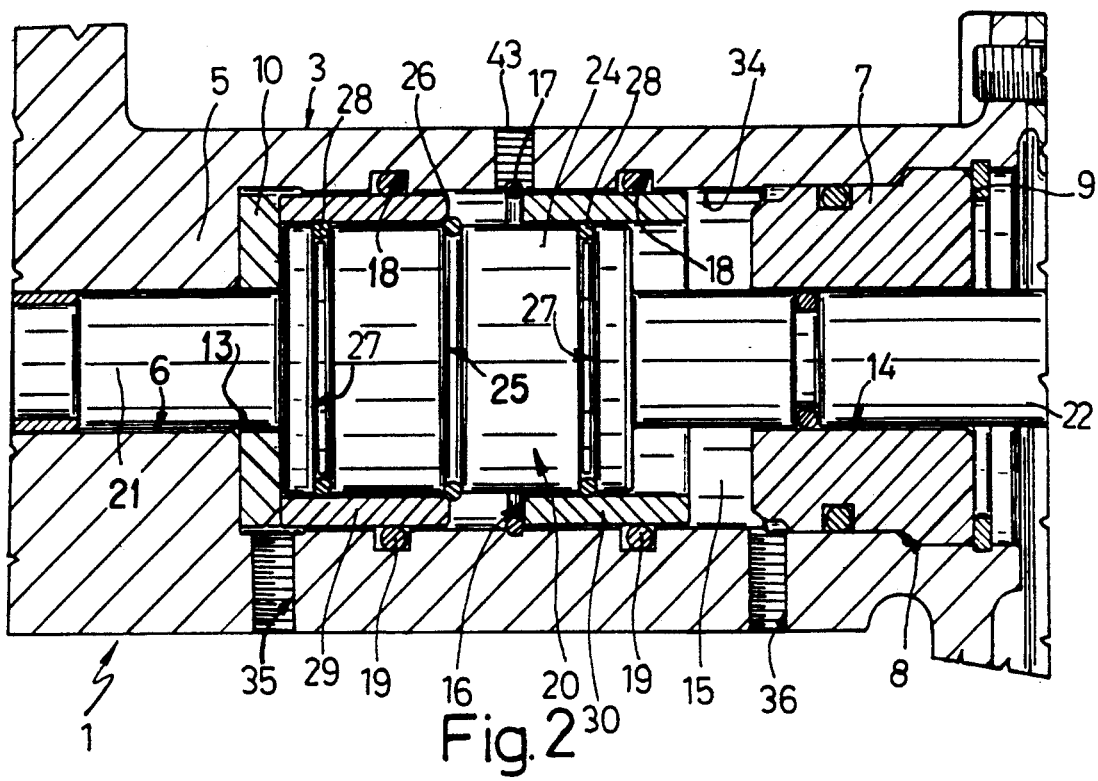
FIGS. 2 and 3 show larger-scale sections of part of the FIG. 1 actuator in two different operating positions.

Piston 20 of actuator 1 may assume three positions (center, left, right), as shown respectively in FIGS. 1, 2 and 3, depending on hydraulic control by solenoid valves 39, 40.

In FIG. 1, solenoid valves 39, 40 maintain both chambers 33 and 34 under pressure; the pressure on bushes 29, 30 pushes them together into contact with toroidal ring 17, which acts as a central limit stop; and piston 20, which is subjected to the same hydraulic pressure on its identical active end surfaces, is maintained in the center position by bushes 29, 30 cooperating with toroidal ring 26.

Figure 3:
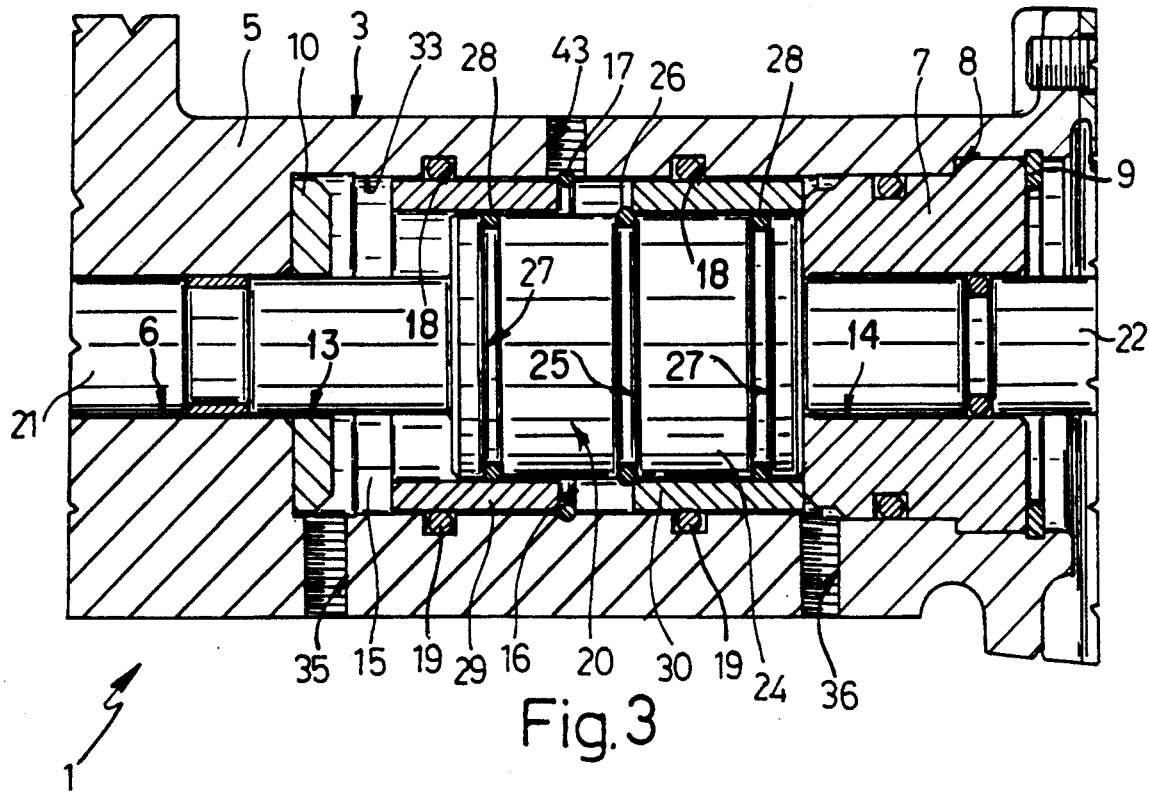

The left position in FIG. 2 is achieved by feeding oil under pressure into chamber 34, and draining chamber 33 via solenoid valve 39. Hydraulic pressure is thus exerted on bush 30, which is maintained contacting toroidal ring 17, and on piston 20, which slides leftwards taking bush 29 with it by virtue of toroidal ring 26. Piston 20 is arrested on reaching plate 10. To return to the center position, chamber 33 is simply re-pressurized while at the same time maintaining pressure in chamber 34. Pressure is therefore exerted on both the end surfaces of piston 20, thus providing for hydraulic balance of the same, and on the opposite end surfaces of bushes 29, 30. The pressure on bush 30 is discharged on toroidal ring 17, whereas bush 29 slides rightwards taking piston 20 with it by virtue of toroidal ring 26, until it contacts toroidal ring 17. At the same time, toroidal ring 26 moves into contact with bush 30, thus arresting piston 20 in the FIG. 1 position. The right position in FIG. 3 and return to the center position is FIG. 1 are achieved in the same way as described above, by simply inverting control of solenoid valves 39, 40 i.e. by draining and pressurizing chamber 34 while at the same time maintaining pressure inside chamber 33.

The above positions of piston 20 correspond to respective positions of clutch control rod 2 integral with the same. That is, the center position conveniently corresponds to neutral (no gear engaged), and the right and left positions to engagement of two different transmission ratios.

Engagement of a given gear is detected by position sensor 49, the moving element 48 of which is maintained contacting conical end portion 47 of rod 22.

The advantages of actuator 1 according to the present invention will be clear from the foregoing description. In particular, it is of straightforward, low-cost design, and does not require a complex hydraulic control circuit. Also, by virtue of comprising one dual-rod piston, it provides for indirectly detecting the position of the controlled member, i.e. the active rod, by detecting the position of the non-active rod, thus simplifying assembly and reducing overall size.

To those skilled in the art it will be clear that changes may be made to actuator 1 as described and illustrated herein without, however, departing from the scope of the present invention. For example, sealing rings 19 may be housed inside seated formed on the outer surface of bushes 29, 30 instead of on inner wall 15 of cavity 4; changes may be made to the hydraulic components and control logic; control may be pneumatic instead of hydraulic; position sensor 49 may be of a different type or dispensed with altogether; and actuator 1 may be employed for controlling any type of mechanical member or machine.

What is claimed is:

1. A three-position fluid-controlled actuator comprising an outer body defining a cylindrical cavity having a constant diameter; a piston sliding inside said cavity and having at least one rod projecting from said outer body and secured to clutch means for a mechanical assembly; control means for controlling said piston via a fluid, and connected to two openings formed on said outer body close to opposite ends of said cavity; and auxiliary means sliding inside said cavity and designed to establish an intermediate piston stop position; characterized by the fact that said auxiliary means comprise a couple of bushes (29, 30) coaxial with said piston (20) and sliding in a sealed manner between said piston (20) and the lateral wall (15) of said cavity (4); first axial locating means (17) for axially locating said bushes with respect to a center portion of said cavity; and second axial locating means (26) for axially locating said bushes (29, 30) with respect to a center portion of said piston (20), said bushes being mounted on opposite axial sides with respect to said first and second locating means.

2. An actuator as claimed in claim 1, characterised by the fact that said first and second axial locating means respectively comprise a first ring (17) integral with said lateral wall (15) of said cavity (4), and a second ring (26) integral with said piston (20).

3. An actuator as claimed in claim 2, characterised by the fact that it comprises two bushes (29, 30) mounted on opposite axial sides in relation to said rings (17, 26).

4. An actuator as claimed in claim 2, characterised by the fact that said rings (17, 26) are toroidal.

5. An actuator as claimed in claim 2, characterised by the fact that said rings (17, 26) are mounted in respective annular seats (16, 25) formed in said center portions of said lateral wall (15) of said cavity (4) and said piston (20).

6. An actuator as claimed in claim 1, characterised by the fact that it comprises a second rod (22) opposite said first rod (21); and a sensor (49) for detecting the position of said second rod (22).

7. An actuator as claimed in claim 6, characterised by the fact that said second rod (22) comprises a conical end portion (47) cooperating with a moving element (48) of said sensor (49).

8. An actuator as claimed in claim 1, characterised by the fact that said fluidic control means comprise two solenoid valves (39, 40) and a control system (52).

9. An actuator as claimed in claim 8, characterised by the fact that said control system (52) is connected to said sensor (49) and receives from the same an input signal (53) as a function of the position of said piston (20).

* * * * *